US012029929B2

(12) United States Patent
Shipman

(10) Patent No.: US 12,029,929 B2
(45) Date of Patent: Jul. 9, 2024

(54) FLEXIBLE DRY SPRINKLER

(71) Applicant: VICTAULIC COMPANY, Easton, PA (US)

(72) Inventor: Buddy Clayton Shipman, Heath, TX (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

(21) Appl. No.: 17/014,275

(22) Filed: Sep. 8, 2020

(65) Prior Publication Data

US 2020/0398091 A1 Dec. 24, 2020

Related U.S. Application Data

(63) Continuation of application No. 15/151,847, filed on May 11, 2016, now Pat. No. 10,799,737, which is a (Continued)

(51) Int. Cl.

*A62C 35/62* (2006.01)
*A62C 3/00* (2006.01)

(Continued)

(52) U.S. Cl.

CPC .............. *A62C 35/62* (2013.01); *A62C 3/004* (2013.01); *A62C 35/645* (2013.01); *A62C 35/68* (2013.01);

(Continued)

(58) Field of Classification Search

CPC ....... A62C 3/004; A62C 35/62; A62C 35/645; A62C 35/68; A62C 37/11; A62C 37/12; A62C 37/14

See application file for complete search history.

(56) References Cited

U.S. PATENT DOCUMENTS 306,662 A 10/1884 Kavanagh
1,182,460 A 5/1916 Cruger et al.

(Continued)

FOREIGN PATENT DOCUMENTS

CN 2380254 5/2000
DE 3919638 11/1990

(Continued)

OTHER PUBLICATIONS

Apr. 22, 2015 Extended European Search Report issued in Application No. 12792109.6.

(Continued)

*Primary Examiner* — Darren W Gorman
(74) *Attorney, Agent, or Firm* — Pillsbury Winthrop Shaw Pittman, LLP

(57) ABSTRACT

A fire sprinkler head has a valve with an X-brace latch, and includes a flexible conduit. A sprinkler nozzle is secured to a first end of the flexible conduit. The sprinkler nozzle includes a first fitting, a sprinkler orifice and fusible element. A second fitting is secured to the second end of the flexible conduit and includes the valve. The valve has a valve element which is moveable from a latched position to an unlatched position. A flexible link extends from the sprinkler nozzle to the X-brace valve latch. Breaking of the fusible element releases the flexible link to move from the latched position to the unlatched position, releasing the valve for flow there-through.

22 Claims, 4 Drawing Sheets

Related U.S. Application Data continuation of application No. 13/176,834, filed on Jul. 6, 2011, now Pat. No. 9,358,411.

(60) Provisional application No. 61/496,347, filed on Jun. 13, 2011, provisional application No. 61/490,737, filed on May 27, 2011.

(51) Int. Cl.
*A62C 35/64* (2006.01)
*A62C 35/68* (2006.01)
*A62C 37/11* (2006.01)
*A62C 37/12* (2006.01)
*A62C 37/14* (2006.01)
*A62C 37/46* (2006.01)
*A62C 37/48* (2006.01)

(52) U.S. Cl.
CPC .............. *A62C 37/11* (2013.01); *A62C 37/12* (2013.01); *A62C 37/14* (2013.01); *A62C 37/46* (2013.01); *A62C 37/48* (2013.01)

(56) References Cited

U.S. PATENT DOCUMENTS

| | | | |
|---|---|---|---|
| 1,903,150 | A | 3/1933 | Tyden |
| 2,155,990 | A | 4/1939 | Hdgman |
| 2,180,258 | A | 11/1939 | Rowley |
| 2,211,399 | A | 8/1940 | Winslow |
| 2,871,953 | A | 2/1959 | Bray |
| 3,007,528 | A | 11/1961 | Gloeckler |
| 3,067,823 | A | 12/1962 | Kavanagh |
| 3,135,331 | A | 6/1964 | Lee |
| 3,309,028 | A | 3/1967 | Zieg et al. |
| 3,584,689 | A | 6/1971 | Willms |
| 3,616,860 | A | 11/1971 | Williams |
| 3,768,567 | A | 10/1973 | Weise |
| 3,857,277 | A | 12/1974 | Moore, Jr. et al. |
| 3,949,812 | A | 4/1976 | Hay |
| 4,177,862 | A | 12/1979 | Bray |
| 4,179,751 | A | 12/1979 | Adachi |
| 4,217,961 | A | 8/1980 | Wotton |
| 4,220,208 | A | 9/1980 | Jackson et al. |
| 4,275,449 | A | 6/1981 | Aish |
| 4,305,469 | A | 12/1981 | Morrisette |
| 4,353,117 | A | 10/1982 | Spellman |
| 4,427,974 | A | 1/1984 | Sheahan |
| 4,464,719 | A | 8/1984 | Spellman |
| 4,551,810 | A | 11/1985 | Levine |
| 4,570,719 | A | 2/1986 | Wilk |
| 4,648,460 | A | 3/1987 | McCulloch |
| 4,700,317 | A | 10/1987 | Watanabe |
| 4,700,318 | A | 10/1987 | Ockman |
| 4,744,658 | A | 5/1988 | Holly |
| 4,774,658 | A | 9/1988 | Lewin |
| 4,789,944 | A | 12/1988 | Wada et al. |
| 4,811,243 | A | 3/1989 | Racine |
| 4,831,546 | A | 5/1989 | Mitsuta et al. |
| 4,854,388 | A | 8/1989 | Wyatt |
| 4,885,694 | A | 12/1989 | Pray et al. |
| 4,964,060 | A | 10/1990 | Hartsog |
| 4,985,855 | A | 1/1991 | Aldrich et al. |
| 4,991,655 | A | 2/1991 | McHugh |
| 4,992,953 | A | 2/1991 | Yoshida et al. |
| 5,021,779 | A | 6/1991 | Bisak |
| 5,021,968 | A | 6/1991 | Ferketic |
| 5,103,214 | A | 4/1992 | Curran et al. |
| 5,109,337 | A | 4/1992 | Ferriter et al. |
| 5,111,392 | A | 5/1992 | Malin |
| 5,139,044 | A | 8/1992 | Otten et al. |
| 5,154,232 | A | 10/1992 | McHugh |
| 5,188,184 | A | 2/1993 | Northill |
| 5,189,394 | A | 2/1993 | Walter et al. |
| 5,227,983 | A | 7/1993 | Cox et al. |
| 5,255,207 | A | 10/1993 | Cornwell |
| 5,260,883 | A | 11/1993 | Wilson |
| 5,297,635 | A | 3/1994 | McHugh |
| 5,299,307 | A | 3/1994 | Young |
| 5,327,976 | A | 7/1994 | Hattori |
| 5,329,464 | A | 7/1994 | Sumic et al. |
| 5,334,970 | A | 8/1994 | Bailey |
| 5,390,744 | A | 2/1995 | McHugh |
| 5,396,959 | A | 3/1995 | Macdonald |
| 5,398,277 | A | 3/1995 | Marting |
| 5,414,408 | A | 5/1995 | Berra |
| 5,415,239 | A | 5/1995 | Kotter et al. |
| 5,517,428 | A | 5/1996 | Williams |
| 5,533,576 | A | 7/1996 | Mears |
| 5,546,564 | A | 8/1996 | Horie |
| 5,557,537 | A | 9/1996 | Normann et al. |
| 5,570,745 | A | 11/1996 | MacDonald, III |
| 5,608,375 | A | 3/1997 | Kosick |
| 5,627,763 | A | 5/1997 | Carlson |
| 5,655,087 | A | 8/1997 | Hino et al. |
| 5,668,736 | A | 9/1997 | Douglas et al. |
| 5,708,798 | A | 1/1998 | Lynch et al. |
| 5,743,337 | A | 4/1998 | MacDonald, III |
| 5,761,674 | A | 6/1998 | Ito |
| 5,775,431 | A | 7/1998 | Ondracek |
| 5,808,905 | A | 9/1998 | Normann et al. |
| 5,812,394 | A | 9/1998 | Lewis et al. |
| 5,842,526 | A | 12/1998 | Archer et al. |
| 5,877,683 | A | 3/1999 | Sheasley |
| 5,920,849 | A | 7/1999 | Broughton et al. |
| 5,967,237 | A | 10/1999 | Sundholm |
| 5,967,240 | A | 10/1999 | Ondracek |
| 5,977,872 | A | 11/1999 | Guertin |
| 5,987,458 | A | 11/1999 | Anderson et al. |
| 6,024,175 | A | 2/2000 | Moore, Jr. et al. |
| 6,064,982 | A | 5/2000 | Puri |
| 6,081,196 | A | 6/2000 | Young |
| 6,085,586 | A | 7/2000 | Arvidson |
| 6,105,678 | A | 8/2000 | Tsai |
| 6,119,784 | A | 9/2000 | MacDonald, III et al. |
| 6,123,154 | A | 9/2000 | MacDonald, III et al. |
| 6,141,924 | A | 11/2000 | Quaintance |
| 6,158,519 | A | 12/2000 | Kretschmer |
| 6,164,324 | A | 12/2000 | Gradle |
| 6,236,409 | B1 | 5/2001 | Hartman |
| 6,239,708 | B1 | 6/2001 | Young |
| 6,266,396 | B1 | 7/2001 | Johnson |
| 6,272,447 | B1 | 8/2001 | Gavin et al. |
| 6,275,160 | B1 | 8/2001 | Ha |
| 6,293,348 | B1 | 9/2001 | Reilly |
| 6,304,790 | B1 | 10/2001 | Nakamura et al. |
| 6,331,982 | B1 | 12/2001 | Watanabe |
| 6,333,689 | B1 | 12/2001 | Young |
| 6,333,695 | B2 | 12/2001 | Young |
| 6,336,509 | B1 | 1/2002 | Polan et al. |
| 6,340,058 | B1 | 1/2002 | Dominick et al. |
| 6,446,053 | B1 | 9/2002 | Elliott |
| 6,457,165 | B1 | 9/2002 | Isikawa et al. |
| 6,484,513 | B1 | 11/2002 | Chou |
| 6,488,097 | B1 | 12/2002 | MacDonald, III et al. |
| 6,491,109 | B2 | 12/2002 | Christenson et al. |
| 6,526,907 | B1 | 3/2003 | Donehue |
| 6,535,121 | B2 | 3/2003 | Matheny |
| 6,536,533 | B2 | 3/2003 | Reilly |
| 6,567,772 | B1 | 5/2003 | Hoeft |
| 6,604,126 | B2 | 8/2003 | Neiman et al. |
| 6,636,774 | B2 | 10/2003 | Tenma et al. |
| 6,666,277 | B2 | 12/2003 | Reilly |
| 6,691,790 | B1 | 2/2004 | MacDonald, III et al. |
| 6,708,771 | B2 | 3/2004 | Reilly |
| 6,752,218 | B2 | 6/2004 | MacDonald, III et al. |
| 6,760,638 | B1 | 7/2004 | Love et al. |
| 6,778,081 | B2 | 8/2004 | Matheny |
| 6,851,482 | B2 | 2/2005 | Dolan |
| 6,853,299 | B2 | 2/2005 | Shiratori et al. |
| 6,860,331 | B2 | 3/2005 | Hagen et al. |
| 6,879,941 | B1 | 4/2005 | Ehrenberg et al. |
| 6,907,938 | B2 | 6/2005 | MacDonald, III et al. |
| 6,960,638 | B2 | 11/2005 | Quis et al. |
| 7,032,680 | B2 | 4/2006 | MacDonald, III et al. |

(56) References Cited

U.S. PATENT DOCUMENTS

| | | | |
|---|---|---|---|
| 7,047,168 | B2 | 5/2006 | Carballo et al. |
| 7,047,180 | B1 | 5/2006 | Mathews et al. |
| 7,055,612 | B2 | 6/2006 | Jackson et al. |
| 7,062,532 | B1 | 6/2006 | Sweat et al. |
| 7,096,165 | B2 | 8/2006 | Patenburg et al. |
| 7,106,330 | B2 | 9/2006 | Liu et al. |
| 7,143,834 | B2 | 12/2006 | Dolan |
| 7,176,942 | B2 | 2/2007 | Chartier et al. |
| 7,185,711 | B2 | 3/2007 | Jackson et al. |
| 7,213,319 | B2 | 5/2007 | Silva, Jr. et al. |
| 7,293,576 | B2 | 11/2007 | Royse |
| 7,373,720 | B1 | 5/2008 | Jensen et al. |
| 7,416,030 | B2 | 8/2008 | Lupien et al. |
| 7,516,800 | B1 | 4/2009 | Silva et al. |
| 7,559,376 | B2 | 7/2009 | Silva, Jr. |
| 7,644,736 | B2 | 1/2010 | Bittenbender et al. |
| 7,766,252 | B2 | 8/2010 | Jackson et al. |
| 7,802,628 | B1 | 9/2010 | Silva |
| 7,823,650 | B2 | 11/2010 | Eckholm et al. |
| 7,841,418 | B2 | 11/2010 | Pahila et al. |
| 7,921,928 | B2 | 4/2011 | Thompson et al. |
| 8,127,860 | B2 | 3/2012 | Golinveaux |
| 8,191,647 | B2 | 6/2012 | Cordell et al. |
| 8,336,920 | B2 | 12/2012 | Stempo et al. |
| 8,887,822 | B2 | 11/2014 | Polan |
| 9,339,673 | B2 | 5/2016 | Shipman |
| 9,358,411 | B2 | 6/2016 | Shipman |
| 10,265,560 | B2 | 4/2019 | Polan |
| 10,493,307 | B2 | 12/2019 | Polan |
| 2001/0026225 | A1 | 10/2001 | Young |
| 2001/0037190 | A1 | 11/2001 | Jung |
| 2001/0047251 | A1 | 11/2001 | Kemp |
| 2001/0052908 | A1 | 12/2001 | Hartman |
| 2002/0003042 | A1 | 1/2002 | Reilly |
| 2002/0011342 | A1 | 1/2002 | Reilly |
| 2002/0035408 | A1 | 3/2002 | Smith |
| 2002/0035450 | A1 | 3/2002 | Thackston |
| 2002/0050531 | A1 | 5/2002 | Dolan |
| 2002/0183982 | A1 | 5/2002 | Rauscher |
| 2002/0121381 | A1 | 9/2002 | Reilly |
| 2002/0178428 | A1 | 11/2002 | Horne et al. |
| 2003/0074164 | A1 | 4/2003 | Simmons et al. |
| 2003/0075343 | A1 | 4/2003 | Ballard |
| 2003/0135352 | A1 | 7/2003 | Carballo et al. |
| 2003/0142109 | A1 | 7/2003 | Brown et al. |
| 2003/0167155 | A1 | 9/2003 | Reghetti et al. |
| 2004/0011537 | A1 | 1/2004 | Jackson et al. |
| 2004/0073410 | A1 | 4/2004 | Maly et al. |
| 2004/0080407 | A1 | 4/2004 | Reghetti et al. |
| 2004/0080408 | A1 | 4/2004 | Reghetti et al. |
| 2004/0080409 | A1 | 4/2004 | Reghetti et al. |
| 2004/0080520 | A1 | 4/2004 | Reghetti et al. |
| 2004/0083080 | A1 | 4/2004 | Reghetti et al. |
| 2004/0083081 | A1 | 4/2004 | Reghetti et al. |
| 2004/0123989 | A1 | 7/2004 | Sprakel et al. |
| 2005/0090604 | A1 | 4/2005 | Quis et al. |
| 2005/0102051 | A1 | 5/2005 | Okada et al. |
| 2005/0121206 | A1 | 6/2005 | Dolan |
| 2005/0284644 | A1 | 12/2005 | MacDonald, III et al. |
| 2006/0113094 | A1 | 6/2006 | Silva, Jr. et al. |
| 2007/0039743 | A1 | 2/2007 | MacDonald, III et al. |
| 2007/0095548 | A1 | 5/2007 | MacDonald, III et al. |
| 2007/0169946 | A1 | 7/2007 | Cordell et al. |
| 2007/0174026 | A1 | 7/2007 | Mangon et al. |
| 2007/0174027 | A1 | 7/2007 | Moiseyev |
| 2007/0179759 | A1 | 8/2007 | Mangon |
| 2008/0196906 | A1 | 8/2008 | Nusbaum |
| 2008/0277124 | A1 | 11/2008 | Johnston et al. |
| 2009/0008104 | A1 | 1/2009 | MacDonald, III et al. |
| 2010/0038099 | A1 | 2/2010 | Thompson et al. |
| 2011/0315407 | A1 | 12/2011 | Park et al. |
| 2012/0031630 | A1 | 2/2012 | Stephens |
| 2012/0097406 | A1 | 4/2012 | Silcox et al. |
| 2012/0132444 | A1 | 5/2012 | Buzdum et al. |
| 2012/0298382 | A1 | 11/2012 | Shipman |
| 2012/0298383 | A1 | 11/2012 | Shipman |
| 2013/0199803 | A1 | 8/2013 | Multer |
| 2013/0319696 | A1 | 12/2013 | Polan |
| 2014/0174768 | A1 | 6/2014 | Bucher |
| 2015/0060091 | A1 | 3/2015 | Polan |
| 2015/0075821 | A1 | 3/2015 | Bucher |
| 2016/0228734 | A1 | 8/2016 | Shipman |
| 2016/0250507 | A1 | 9/2016 | Shipman |
| 2016/0271432 | A1 | 9/2016 | Shipman |
| 2018/0326238 | A1 | 11/2018 | Polan |
| 2019/0336804 | A1 | 11/2019 | Polan |

FOREIGN PATENT DOCUMENTS

| | | |
|---|---|---|
| EP | 1368589 | 12/2003 |
| EP | 2623161 | 8/2013 |
| GB | 2123689 | 2/1984 |
| JP | 56-066355 | 10/1954 |
| JP | 57-079555 | 10/1955 |
| JP | S52-011998 | 7/1975 |
| JP | S56066355 | 6/1981 |
| JP | S57079555 | 5/1982 |
| JP | 59-000155 | 1/1984 |
| JP | H02096161 | 4/1990 |
| JP | 02-096161 | 7/1990 |
| JP | 5137810 | 1/1993 |
| JP | 6170008 | 6/1994 |
| JP | H06170008 | 6/1994 |
| JP | 2008544808 | 12/2008 |
| KR | 10-2012-0098205 | 9/2012 |
| KR | 20120098205 | 9/2012 |
| KR | 10-1259098 | 5/2013 |
| WO | 154772 | 8/2001 |
| WO | 2070071 | 9/2002 |
| WO | 2007005286 | 1/2007 |
| WO | 2012166636 | 12/2012 |
| WO | 2012166644 | 12/2012 |

OTHER PUBLICATIONS

Aug. 7, 2014 Search Report issued in PCT Application No. PCT/US2013/052835.

Jan. 25, 2016 Office Action issued in U.S. Appl. No. 13/176,834.

Jul. 16, Office Action issued in U.S. Appl. No. 13/176,834.

Jul. 2, 20151nternational Preliminary Report on Patentability issued in Application No. PCT/US2013/052835.

Mar. 18, 2014 Office Action issued in U.S. Appl. No. 13/176,834.

Mar. 21, 2014 Office Action issued in U.S. Appl. No. 13/480,786.

Mar. 24, 2015 Office Action issued in U.S. Appl. No. 13/480,786.

Mar. 27, 2015 Office Action issued in U.S. Appl. No. 13/176,834.

May 11, 2015 Search Report issued in European Application No. 12792109.6.

May 11, 2015 Search Report issued in European Application No. 12793586.4.

May 6, 2015 Office Action issued in Chinese Patent Application No. 201280037396.6.

Nov. 30, 2015 Office Action issued in U.S. Appl. No. 13/480,786.

Nov. 30, 2015 Office Action issued in U.S. Appl. No. 13/722,571.

Oct. 14, 2014 Office Action issued in U.S. Appl. No. 13/480,786.

Oct. 31, 2014 Office Action issued in New Zealand Patent Application No. 618905.

Sep. 29, 2014 Office Action issued in U.S. Appl. No. 13/176,834.

Office Action dated Apr. 5, 2016 in Japanese Patent Application No. 2014512157.

Office Action dated Apr. 5, 2016 in Japanese Patent Application No. 2014512161.

Office Action dated Sep. 21, 2016 in U.S. Appl. No. 14/534,881.

Decision for Refusal issued in Japanese Patent Application No. 2014-512157 dated Nov. 7, 2016 with English translation.

Decision for Refusal issued in Japanese Patent Application No. 2014-512161 dated Nov. 7, 2016 with English translation.

FLEXIBLE DRY SPRINKLER

CROSS-REFERENCE TO RELATED APPLICATIONS

This application is a Continuation Application of U.S. Ser. No. 15/151,847, filed May 11, 2016, which is a Continuation Application of U.S. Ser. No. 13/176,834, filed Jul. 6, 2011, now U.S. Pat. No. 9,358,411, which in turn claims priority to U.S. Provisional Patent Application Ser. No. 61/496,347, filed Jun. 13, 2011 and entitled "Sprinkler Hose Assembly," and U.S. Provisional Patent Application Ser. No. 61/490,737, filed May 27, 2011 and entitled "Corrosion Resistant Straight or Flexible Dry Fire Sprinkler Tube with X-Brace." The disclosures of each of these applications is incorporated by reference herein in entirety.

BACKGROUND

The present invention relates in general to fire sprinkler systems, and in particular to fire sprinkler heads used for sprinkler systems.

Prior art conventional dry barrel sprinklers for use in commercial fire sprinkler systems are sold to fire system installers in fixed lengths. The installer has to first install branch line piping for a sprinkler system and then measure a suitable length for dry barrel fire sprinklers for installation. An installer will order fire sprinklers for the installation according to the lengths measured. Delivery typically takes seven to ten business days, which delays installation and completion of construction projects. Longer delays occur if mistakes are made in measuring and the fire sprinklers have to be reordered in a different length.

Dry fire sprinkler systems often deteriorate rapidly due to condensation being trapped in such systems. With rigid dry sprinkler systems, an increased number of fittings is often required to route rigid piping from a branch line to a desired fire sprinkler head location. This increase in the number of fittings results in providing additional places where condensation may collect without being able to drain. Additionally, dry fire sprinkler systems are filled with air or inert gas which is expelled during operation of such sprinkler systems. The response time for expelling air from the system and providing water to a fire zone is critical for containing a fire. With additional piping and fittings required for routing dry fire sprinkler systems, the volume required for evacuation and filling with water is increased.

SUMMARY OF THE INVENTION

A novel X-brace valve and flexible connection for fire sprinklers are disclosed. The X-brace is preferably included in a flexible fire sprinkler head, but may also be used in rigid sprinkler installations. The flexible fire sprinkler head is preferably a pendent dry fire sprinkler head, which has a flexible body structure, constructed of corrugated or braided hose similar to that commonly used for plumbing household clothes washing machines. A sprinkler nozzle secured to a first end of the conduit, which is preferably provided by a flexible hose. The sprinkler nozzle has a first fitting, a sprinkler orifice and fusible element. The fusible element is preferably provided by a fluid filled glass bulb which will break when ambient temperatures reach a predetermined temperature, A second fitting is secured to a second end of the flexible conduit, and a valve is mounted to the second fitting. The valve includes a valve element which is pivotally mounted to the second fitting and moveable from a latched position to an unlatched position. A flexible link extends from the sprinkler nozzle to the valve latch. Breaking of the fusible element releases the flexible link to move from the latched position to the unlatched position, releasing the valve to open for passing flow there-through. The flexible link provides a spring biased plunger having a plug which fits in the sprinkler orifice to seal against fluid flow there-through. Tension from the spring pulls the rod, or plunger, from within an X-brace valve latch which releases the valve element to open and pass water through the valve.

BRIEF DESCRIPTION OF THE DRAWINGS

For a more complete understanding of the present invention and the advantages thereof, reference is now made to the following description taken in conjunction with the accompanying Drawings in which

FIG. 1 is a side elevation view and partial cut-away view of a dry flexible fire sprinkler head made according to the present invention;

FIG. 2 is sectional view of the flexible fire sprinkler head of FIG. 1, taken along section line 2-2 of FIG. 1, and shows a frontal elevation view of an X-brace valve latch in an unlatched position;

FIG. 3 is a side elevation view of slider lock of the X-brace latch of FIG. 2, and shows the slider lock in a released position;

FIG. 4 is sectional view of the flexible fire sprinkler head of FIG. 1, taken along section line 2-2 of FIG. 1, and shows frontal elevation view of the X-brace valve latch in a latched position;

FIG. 5 is a side elevation view of a slider lock of the X-brace latch of FIG. 4, and shows the slider lock in a latched position;

FIG. 6 is an exploded view of the slider lock of FIG. 5; and

FIG. 7 is a side elevation view of an alternative lock pin.

DETAILED DESCRIPTION OF EMBODIMENTS

Figure 1:
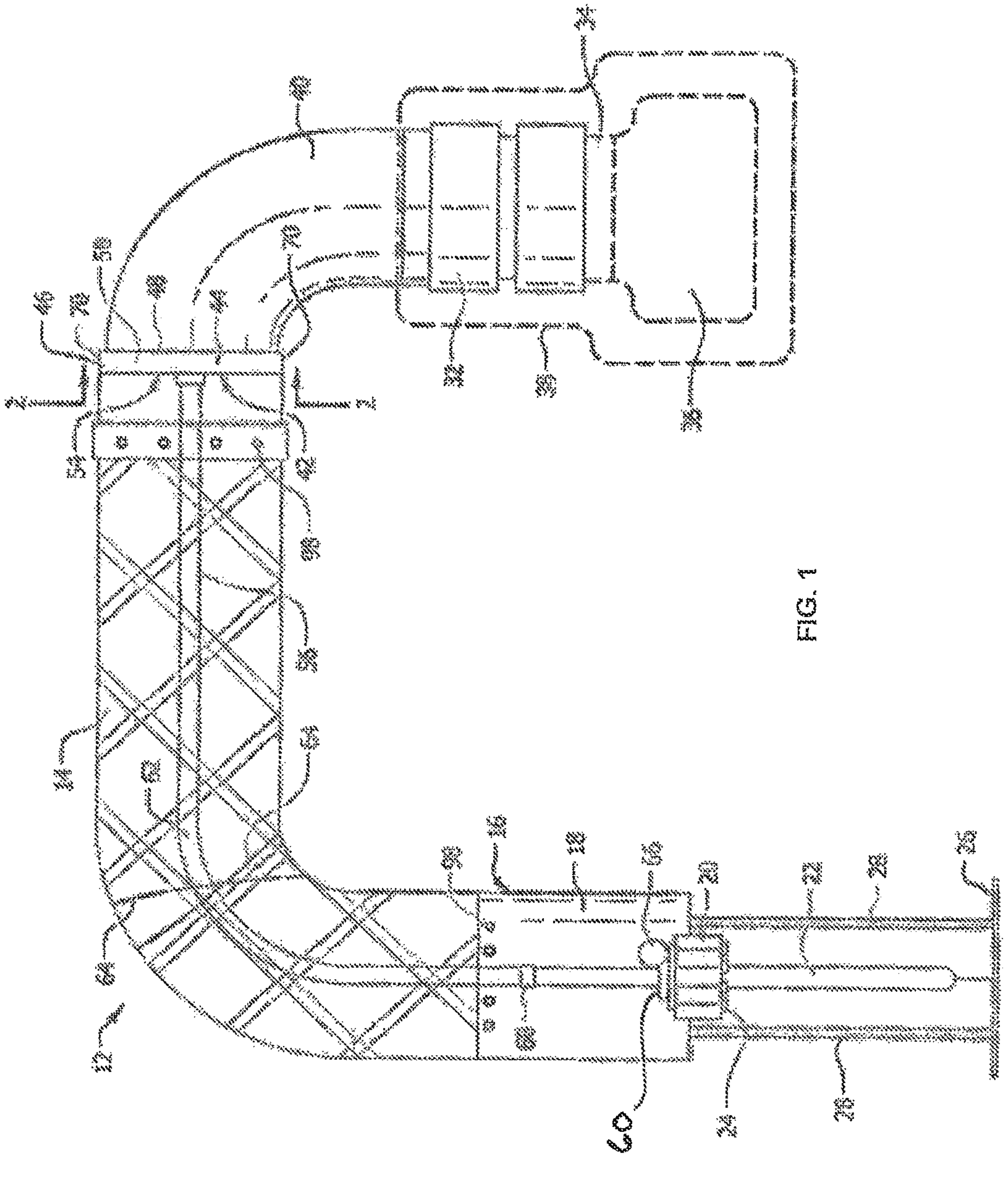
FIGS. 1 through 7 show various aspects for x-brace valve and flexible connection for fire sprinklers devices made according to the present invention, as set forth below.

Referring to the Figures, FIG. 1 is a side elevation view and partial cut-away view of a dry flexible fire sprinkler head 12 made according to the present invention. The sprinkler head 12 has a conduit 14, which is provided a flexible conduit such as that formed with an outer cover of braided metal. A sprinkler nozzle 16 is mounted to a first end of the flexible conduit 14 and a connector fitting 32 is mounted to a second end of the conduit 14. The sprinkler nozzle 16 preferably includes a fitting 18, a sprinkler orifice, and a fusible element 22, such as a fluid filled glass bulb as is conventionally used in other fire sprinkler heads. The fusible element 22 breaks when exposed to a predetermined temperature. A diffuser 26, or spray plate, and support arms 28 are also provided. The connector fitting 32 is preferably secured to the second end of the flexible conduit 14 with an elbow fitting 40 there-between. The connector fitting 32 preferably connects the sprinkler head 12 to a pipe T 34 in a sprinkler branch line 36. A connector coupling 38 secures the fitting 32 to the pipe T 34. A valve 42 is preferably provided between the fitting 32 and the flexible conduit 14, The valve 42 is preferably a swing check valve, such as a clapper valve, and includes a swing-type valve element 44, or clapper, mounted by means of a pivot 46 for angularly moving to engage a seal 48 against a seal seat 50. An X-brace valve latch 54 is provided for securing the valve element 44 in a latched position until the sprinkler head 12 is opened for flow by means of the fusible element 22 breaking in response to exposure to high temperatures.

A flexible link 56 extends from the valve latch 54 to the sprinkler nozzle 16. A first end of the flexible link 56 has a link pin 58 for fitting into the valve latch 54 as described herein-below to secure the valve latch 54 in a latched position. A second end of the link pin 58 has a plug adapter 60 for securing the flexible link 56 to the sprinkler plug 24, such that removal of the sprinkler plug 24 due to breaking of the fusible element 22 will allow downward movement of the flexible link 56. An intermediate portion 62 of the flexible link 56 connects the plug adapter 60 to the link pin 58. Centralizer braces 64 are shown for centering the flexible link 56 within the flexible conduit 14. A bias member 66 is preferably provided by a torsion spring which is connected between the fitting 18 and the orifice 20 and the flexible link 56. A coupler 68 secures the flexible link 56 to a run-out end of the bias member 66, which is preferably provided by a torsion spring. The bias member 66 provides a motive force for moving the flexible link 56 to pull the link pin 58 from engaging within the valve latch 54. A portion of the fitting 40 adjacent the valve latch 54 preferably has an undercut 70. The undercut 70 may be provided by a circumferentially extending groove, or by apertures formed radially into a first end of the fitting 40 to extend along a circumference of the fitting 40, in an angularly spaced, diametrically opposed arrangement.

Figure 2:
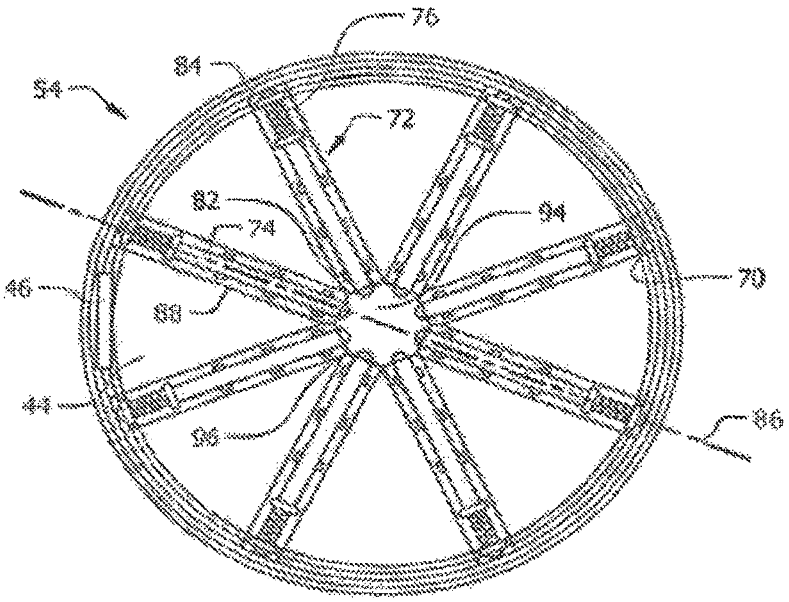
Figure 3:
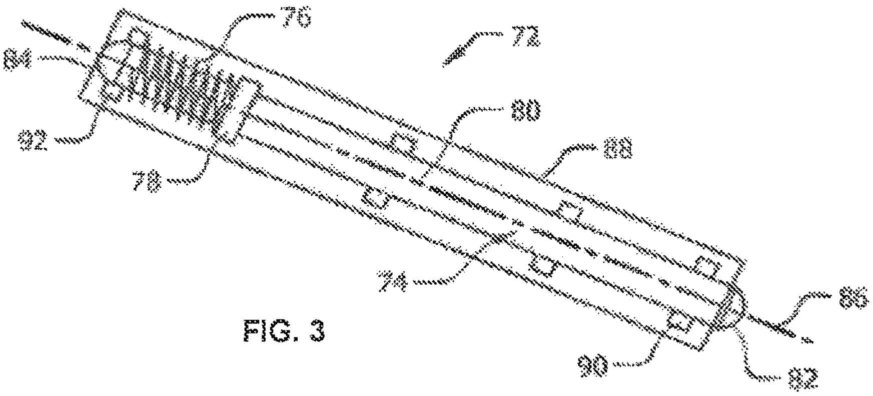

FIG. 2 is sectional view of the flexible sprinkler head 12 of FIG. 1, taken along section line 2-2 of FIG. 1, and shows a frontal elevation view of an X-brace type valve latch 54 in an unlatched position. FIG. 3 is a side elevation view of a slider lock 72 of FIG. 2, and shows the lock pin 74 in a released position. The valve latch 54 is shown having eight slider locks 72 arranged with respective longitudinal axes 86 in an angularly spaced alignment, with the longitudinal axes disposed equal angular distances about a central point of a brace eye 94. When the brace eye 94 is engaged by the flexible link 56, it is coaxial with a centrally disposed, longitudinal axis of the flexible link 56 and the link pin 58. The brace eye 94 defines a centrally disposed section of the valve latch 54, defined within a link pin guide 96 to which first ends of the brace arms 88 are fixedly secured. The slider locks 72 each preferably have a brace arm 88 and a lock pin 74. In some embodiments, the brace arms 88 may be integrally formed as part of the valve element 44. The lock pins 74 have an elongate stem 80, with a follower end 82 and a protuberant end 84. Preferably, the follower end 82 and the protuberant end 84 are of a round shapes. Space apart from the protuberant end 84 is a fixed shoulder 78. A bias member 76 is preferably provided by a wound coil spring for extending between the fixed shoulder 78 and a stop 92 provided on the brace arm 88, such that the lock pin 74 is urged to move away from the protuberance end 82 toward the follower end 82. The brace arms 88 further include retainers 90 for slidably securing the lock pins 74 to the brace arms 88 for reciprocating along respective ones of the longitudinal axes 86. When the link pin 58 is not disposed within the brace eye 94, the lock pins 74 are free to move toward follower ends 82 of respective ones of the slider locks 72 and the associated brace arms 88, such that follower ends 82 protrude into the brace eye 94.

Figure 4:
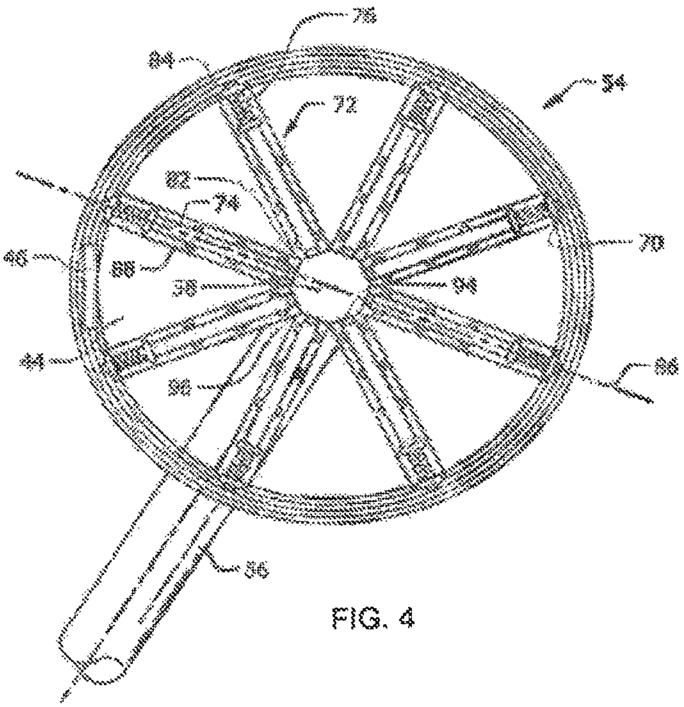
Figure 5:
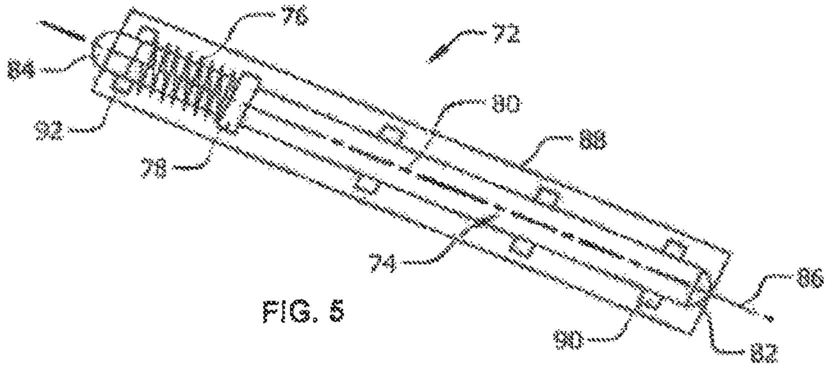
Figure 6:
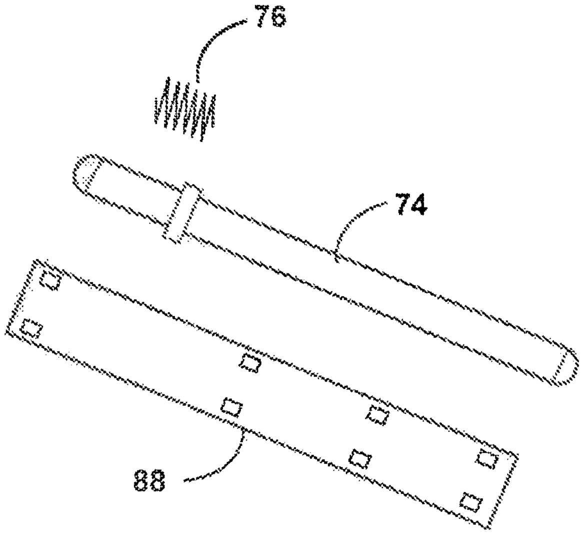

FIG. 4 is sectional view of the flexible sprinkler head 12 of FIG. 1, taken along section line 2-2 of FIG. 1, and shows frontal elevation view of the X-brace valve latch 54 in a latched position. FIG. 5 is a side elevation view and FIG. 6 is an exploded view of a brace arm 88 and lock pin 74 of the X-brace latch 54 of FIG. 4, and shows the lock pin 74 in the latched position. The flexible link 56 is shown in an initial position, as show in FIG. 1, with the link pin 58 engaged within the brace eye 94 of the valve latch 54. The link pin 58 being engaged within the brace eye 94 pushes the lock pins 74 of respective ones of the slider locks 72 radially outward from the brace eye 94, which moves the protuberant portions 84 to radially extend into the undercut 70 and secure the valve element 44 in a closed position. When the link pin 58 is removed from within the brace eye 94, the bias members 76 will urge the lock pins to move from latched positions, shown in FIGS. 4 and 5, into the released positions show in FIGS. 2 and 3, and the valve element 44 will open under the force of fluid pressure within the sprinkler branch line 36.

Figure 7:
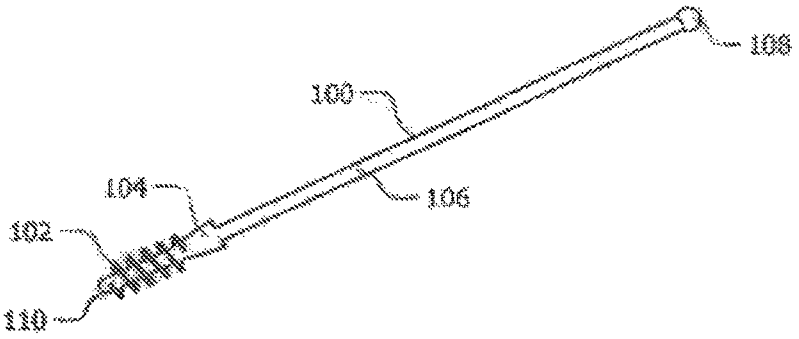

FIG. 7 is a side elevation view of an alternative lock pin 100. The lock pin 100 has a bias member 102 provided by a wound coil spring. The lock pin 100 preferably has an elongate stem 106, a follower end 108 and a protuberant end 110. The follower end 108 and the protuberant end 110 are preferably rounded ends. A fixed shoulder 104 is provided spaced apart from the protuberant end 110, for receiving the bias member 102 there-between.

Vent holes 98 are preferably provided in the fitting 18 and the elbow fitting 40, such that moisture will drain from within the flexible sprinkler head 12. In other embodiments, nitrogen or another inert gas may be sealed within the flexible sprinkler head 12 to prevent moisture from being retained within the sprinkler head 12, rather than providing the vent holes 98.

The X-brace valve element of the present invention may also be used in wet sprinkler installations, and in rigid sprinkler heads. For rigid sprinkler heads, flexible link 56 may be replaced by a rigid link such as a solid rod or a rigid tube, and the flexible conduit 14 replaced with a rigid tubular member, such as a pipe or tubing.

The present invention provides advantages of a flexible sprinkler head for use in dry fire sprinkler installations. An X-brace configuration locks a valve element in a latched position, until a fusible element breaks and then a bias member pulls a flexible link from within the X-brace configuration to release the valve element to open and allow water flow through the flexible sprinkler head.

Although the preferred embodiment has been described in detail, it should be understood that various changes, substitutions and alterations can be made therein without departing from the spirit and scope of the invention as defined by the appended claims.

What is claimed is:

1. A flexible dry fire protection sprinkler comprising:

(A) an inlet having an inlet orifice;

(B) an inlet seal assembly configured to seal the inlet orifice, and having a spring seal that compresses in response to a load;

(C) an inlet release unit configured to release the inlet seal assembly;

(D) a flexible tube having an inlet end connected to the inlet release unit, and an outlet end;

(E) a flexible linkage extending through the flexible tube, and having an inlet end connected to the inlet release unit, and an outlet end;

(F) a bias member connected to the outlet end of the flexible linkage, and configured to displace the outlet end of the flexible linkage upon activation of the flexible dry fire protection sprinkler;

(G) a sprinkler body connected to the bias member, the sprinkler body having an outlet orifice; and (H) an outlet seal assembly configured to seal the outlet orifice of the sprinkler body until ambient temperature reaches a predetermined temperature, wherein, when the ambient temperature reaches the predetermined temperature, the outlet seal assembly is released from the outlet orifice of the sprinkler body, and the bias member displaces the flexible linkage in an outlet direction from a first position to a second position, causing the inlet end of the flexible linkage to operate the inlet release unit, thereby releasing the inlet seal assembly from the inlet orifice of the inlet.

2. The flexible dry fire protection sprinkler of claim 1, wherein bending of the flexible tube causes bending of the flexible linkage.

3. The flexible dry fire protection sprinkler according to claim 1, wherein the outlet seal assembly includes: (a) an outlet seal configured to seal the outlet orifice; and (b) a thermally responsive element configured to hold the outlet seal in the outlet orifice prior to failing, and configured to fail at the predetermined temperature, wherein, when the thermally responsive element fails, the outlet seal is released from the outlet orifice, thereby activating the flexible dry fire protection sprinkler.

4. A flexible dry fire protection sprinkler comprising:

(A) an inlet seal assembly configured to seal an inlet orifice, and having a spring seal that compresses in response to a load;

(B) an inlet release unit configured to release the inlet seal assembly;

(C) a flexible tube having an inlet end connected to the inlet release unit, and an outlet end;

(D) a flexible linkage extending through the flexible tube, and having an inlet end connected to the inlet release unit, and an outlet end;

(E) a bias member connected to the outlet end of the flexible linkage, and configured to displace the outlet end of the flexible linkage upon activation of the flexible dry fire protection sprinkler;

(F) a sprinkler body connected to the bias member, the sprinkler body having an outlet orifice; and (G) an outlet seal assembly configured to seal the outlet orifice of the sprinkler body until ambient temperature reaches a predetermined temperature, wherein, when the ambient temperature reaches the predetermined temperature, the outlet seal assembly is released from the outlet orifice of the sprinkler body, and the bias member displaces the flexible linkage, causing the inlet end of the flexible linkage to operate the inlet release unit, thereby releasing the inlet seal assembly from the inlet orifice.

5. The flexible dry fire protection sprinkler according to claim 4, wherein the bias member displaces the flexible linkage in an outlet direction.

6. The flexible dry fire protection sprinkler according to claim 5, wherein the bias member displaces the flexible linkage in the outlet direction from a first position to a second position.

7. The flexible dry fire protection sprinkler according to claim 4, wherein bending of the flexible tube causes bending of the flexible linkage.

8. The flexible dry fire protection sprinkler according to claim 4, wherein the outlet seal assembly includes an outlet seal that is configured to seal the outlet orifice.

9. The flexible dry fire protection sprinkler according to claim 8, further comprising a thermally responsive element configured to hold the outlet seal in the outlet orifice prior to the thermally responsive element failing.

10. The flexible dry fire protection sprinkler according to claim 9, wherein the thermally responsive element is configured to fail at the predetermined temperature.

11. The flexible dry fire protection sprinkler according to claim 10, wherein, when the thermally responsive element fails, the outlet seal is released from the outlet orifice, thereby activating the flexible dry fire protection sprinkler.

12. A flexible dry fire protection sprinkler comprising:

(A) a flexible tube having a first end and a second end;

(B) an inlet positioned at the first end of the flexible tube, the inlet defining an inlet orifice operatively sealed by an inlet seal having a spring seal that compresses in response to a load;

(C) an inlet release unit constructed to operatively release the inlet seal;

(D) an outlet positioned at the second end of the flexible tube;

(E) a flexible linkage extending between the inlet and the outlet through the flexible tube, the flexible linkage having a first end and a second end and constructed to operatively release the inlet seal;

(F) a bias member connected to the second end of the flexible linkage, and configured to displace the second end of the flexible linkage upon activation of the flexible dry fire protection sprinkler;

(G) a fire sprinkler connected to the bias member comprising a sprinkler body having an outlet orifice operatively sealed by an outlet seal; and (H) the outlet seal configured to seal the outlet orifice of the sprinkler body until ambient temperature reaches a predetermined temperature, wherein, when the ambient temperature reaches the predetermined temperature, the outlet seal is released from the outlet orifice of the sprinkler body, and the bias member displaces the flexible linkage in an outlet direction from a first position to a second position, causing the first end of the flexible linkage to operate the inlet release unit, thereby releasing the inlet seal from the inlet orifice.

13. The flexible dry fire protection sprinkler of claim 12, wherein bending of the flexible tube causes bending of the flexible linkage.

14. The flexible dry fire protection sprinkler according to claim 12, wherein the outlet seal comprises: (a) an outlet seal configured to seal the outlet orifice; and (b) a thermally responsive element configured to hold the outlet seal in the outlet orifice prior to failing, and configured to fail at the predetermined temperature, wherein, when the thermally responsive element fails, the outlet seal is released from the outlet orifice, thereby activating the flexible dry fire protection sprinkler.

15. A flexible dry fire protection sprinkler comprising:

(A) a flexible tube having a first end and a second end;

(B) an inlet seal configured to seal an inlet orifice, and having a spring seal that compresses in response to a load;

(C) an inlet release unit configured to release the inlet seal;

(D) an outlet positioned at the second end of the flexible tube;

(E) a flexible linkage extending between the first end of the flexible tube and the outlet through the flexible tube, the flexible linkage having a first end and a second end and constructed to operatively release the inlet seal;

(F) a bias member connected to the second end of the flexible linkage, and configured to displace the second end of the flexible linkage upon activation of the flexible dry fire protection sprinkler;

(G) a fire sprinkler connected to the bias member comprising a sprinkler body having an outlet orifice operatively sealed by an outlet seal; and (H) the outlet seal configured to seal the outlet orifice of the sprinkler body until ambient temperature reaches a predetermined temperature, wherein, when the ambient temperature reaches the predetermined temperature, the outlet seal is released from the outlet orifice of the sprinkler body, and the bias member displaces the flexible linkage, causing the first end of the flexible linkage to operate the inlet release unit, thereby releasing the inlet seal from the inlet orifice.

16. The flexible dry fire protection sprinkler according to claim 15, wherein the bias member displaces the flexible linkage in an outlet direction.

17. The flexible dry fire protection sprinkler according to claim 16, wherein the bias member displaces the flexible linkage in the outlet direction from a first position to a second position.

18. The flexible dry fire protection sprinkler according to claim 15, wherein bending of the flexible tube causes bending of the flexible linkage.

19. The flexible dry fire protection sprinkler according to claim 15, wherein the outlet seal includes a seal configured to seal the outlet orifice.

20. The flexible dry fire protection sprinkler according to claim 19, further comprising a thermally responsive element configured to hold the outlet seal in the outlet orifice prior to the thermally responsive element failing.

21. The flexible dry fire protection sprinkler according to claim 20, wherein the thermally responsive element is configured to fail at the predetermined temperature.

22. The flexible dry fire protection sprinkler according to claim 21, wherein, when the thermally responsive element fails, the outlet seal is released from the outlet orifice, thereby activating the flexible dry fire protection sprinkler.

* * * * *